R. R. STABLER.
AUTOMOBILE LOCK.
APPLICATION FILED JUNE 1, 1920.
1,363,285.
Patented Dec. 28, 1920.
2 SHEETS—SHEET 1.
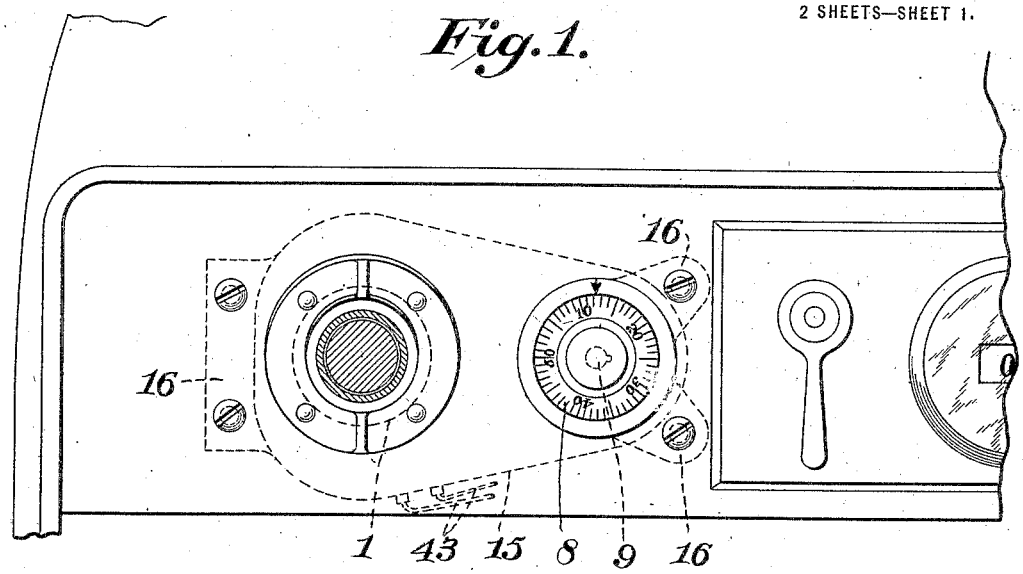
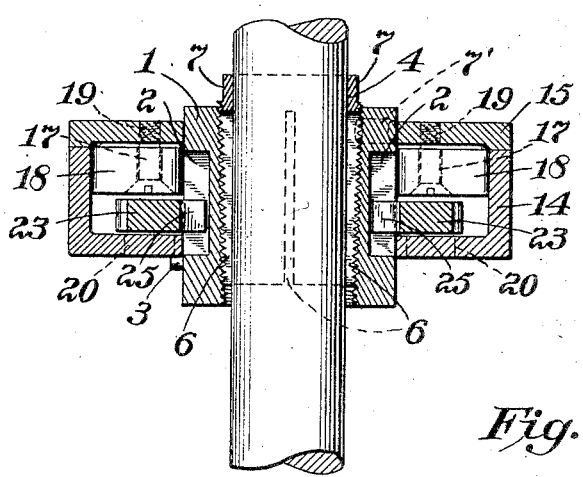
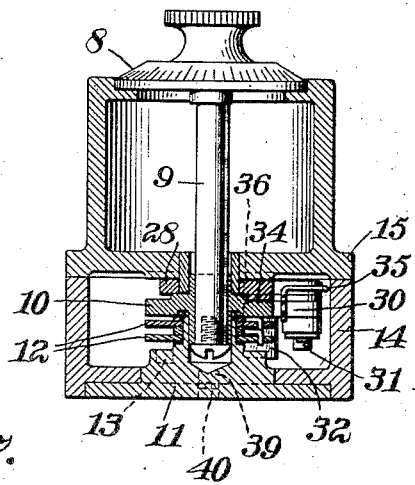
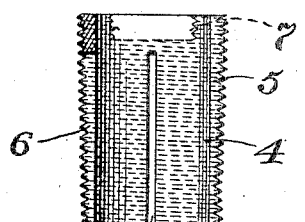
Inventor:
Robinson R. Stabler,
By
Spear, Middleton, Donaldson & Hall
Attorneys.

R. R. STABLER.
AUTOMOBILE LOCK.
APPLICATION FILED JUNE 1, 1920.
1,363,285.
Patented Dec. 28, 1920.
2 SHEETS—SHEET 2.
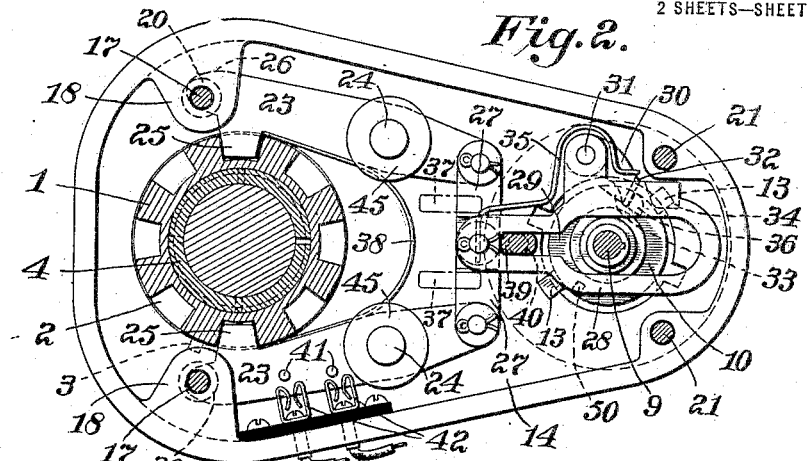
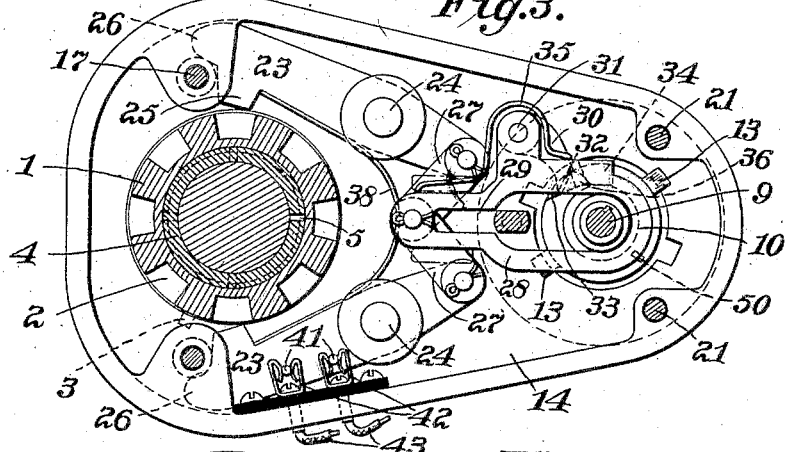
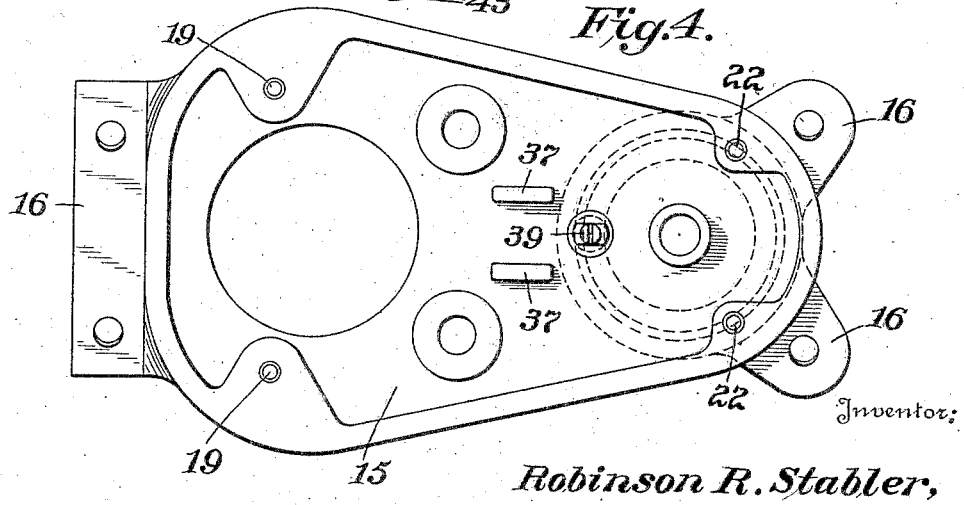
Inventor:
Robinson R. Stabler,
By Spear, Middleton, Donaldson & Hall.
Attorneys

UNITED STATES PATENT OFFICE.

ROBINSON R. STABLER, OF BALTIMORE, MARYLAND, ASSIGNOR TO THE STABLER AUTO ACCESSORIES CO., OF BALTIMORE, MARYLAND, A CORPORATION OF MARYLAND.

AUTOMOBILE-LOCK.

1,363,285.      Specification of Letters Patent.      Patented Dec. 28, 1920.

Application filed June 1, 1920. Serial No. 385,747.

*To all whom it may concern:*

Be it known that I, ROBINSON R. STABLER, a citizen of the United States, and a resident of Baltimore, in the State of Maryland, have invented certain new and useful Improvements in Automobile - Locks, of which the following is a specification.

This invention relates to locks for automobiles and aims to prevent unauthorized starting of the engine thereof or a removal of the car.

One object of this invention is to simultaneously break the electrical circuit and lock the front wheels in any desired position.

Another object is to provide a lock of the above type in which no keys are used, the release of the locking mechanism depending entirely upon a combination known only to the operator of the automobile.

Another object is to provide a lock for automobiles in which the locking mechanism is thoroughly protected and cannot be removed when in the locked position.

With these and other objects in view, the invention consists in the novel features of construction, arrangement and combination of parts more fully hereinafter described and particularly defined in the appended claims.

In the drawings, which are to be taken as merely illustrative of one manner of carrying out my invention:

Figure 1 is a plan view of an automobile instrument board showing the device in place.

Fig. 2 is a plan view of the lower housing and assembly showing the parts in locked position.

Fig. 3 is a view similer to Fig. 2 showing the parts in unlocked position.

Fig. 4 is a plan view of the under side of the upper housing.

Fig. 5 is a vertical sectional view taken through the axis of the barrel combination.

Fig. 6 is a vertical sectional view through the steering post attachment showing the parts in the locked position.

Fig. 7 is a side elevation of the tapered nipple used to secure the steering post attachment to the steering post.

Referring now to the drawings, it will be seen that the device consists of three main parts, namely, the ordinary barrel combination mechanism, the steering post attachment, and the locking mechanism in a housing and actuated by the barrel combination.

The steering post attachment consists of a main annular member 1 provided with longitudinal recesses 2 opposed diametrically and arranged at intervals in the outer periphery thereof. A stop 3 near the base of member 1 limits its upward movement while being assembled on the steering post and insures the locking recesses 2 being in a plane with the locking lugs more fully hereinafter described.

A frusto-conical channel extends centrally and longitudinally of member 1 and is threaded to receive the similarly tapered and threaded nipple 4. This member is split full length as at 5 and is provided with longitudinal saw cuts extending almost to the top as shown at 6. Flattened portions 7 are provided in order that a wrench may be applied to tighten or loosen the assembly. It will now be seen that by inserting the nipple and annular member 1 over the steering post the two may be secured to the post by giving member 4 a few turns owing to the tapered shape of both members 1 and 4. A recess 7 is provided for a set screw in order to lock the assembly to the post if desired but ordinarily this will not be required.

The barrel combination is of ordinary construction and consists of the usual dial 8, mounted on spindle 9 which is keyed to the disk 10 in the ordinary manner. The base plate 11 carries the combination disks 12 and is provided with lugs 13 which form a bayonet joint with the locking mechanism housing.

The locking mechanism consists in a two part housing 14 and 15 adapted to be secured to the under side of an automobile instrument board, and allow the barrel combination dial and casing to protrude through the board. The housing may be secured by means of screws, bolts or rivets through ears 16 in any approved manner. The two portions of the housing are secured together at one end by means of screws 17, passing through ears 18 protruding from the inner periphery of housing 14 and engaging threaded recesses 19 in member 15. Holes are provided as at 20 in housing 14 in order to render the screw heads accessible when the device is in the unlocked position, as more fully hereinafter described.

The other ends of the housings are secured together by screws 21 passing through a thickened portion of the wall 14 into threaded recesses 22 in member 15. The screw heads are adapted to lie flush with the bottom of the recess for the barrel combination base plate.

Locking arms are shown at 23 pivoted at 24 and provided with lugs 25 which enter the locking recesses on the steering post mechanism. The pivots 24 extend upward into recesses provided in the upper housing to insure a rigid bearing for the locking arms, and members 45 serve to space the locking arms from housing 15. The arms are provided with enlarged ends beyond the lugs 25, shown at 26 adapted to cover the heads of the screws 17 when in the locked position only. Pivoted to the other end of arms 23 are links 27 in turn pivoted to a slide 28. The slide is provided with a main opening to clear the dial spindle and a smaller parallel sided slot 29, the purpose of which will be more fully described hereinafter. The pick up pawl 30 for the disk 10 and the combination disks 12 and which also actuates the slide is pivoted to the slide at 31, and is provided with a depending projection 32 of sufficient length to contact with disk 10 and combination disks 12 in their alined recesses 33. A wire spring 35 shown, attached to the pivot joint of links 27 and the slide 28 exerts pressure on pawl 30 to insure an engagement with recesses 33 when they are in alinement. The slide is provided with a boss 34 on its under side with which boss 36 on disk 10 engages to retract the slide in order to unlock the lugs from the locking recesses.

Depending lugs 37 on housing 15 straddle the narrow portion of the slide and insure an equal pressure being exerted on each locking arm when the slide is moved.

A band clock spring 38 is inserted between the locking arms to prevent the locking lugs from engaging the recesses 2 through vibration while in the unlocked position.

A headless screw 39 is threaded into housing 15 and is provided with an enlarged parallel sided portion equal in width to the slot 29 in the slide. The top of this screw lies flush with the bottom of the combination base plate recess.

A hole 40 in base plate 11 allows access to be had to the head of the screw 39 when the lugs on the base plate have been engaged in the bayonet joint and the plate rotated. When the locking lugs are in the unlocked position, the enlarged portion of the screw 39 clears the slot and permits of the screw being turned. When the device is assembled and the screw accessible through hole 40 in the base plate, turning of the screw will raise it above the level of the base plate recess which prevents the base plate from being rotated, which prevents removal of the plate due to the bayonet joint. When the lugs are in the locking recesses, the slide being retracted, the enlarged parallel sided portion of screw 39 rides in slot 29 which prevents it from being turned.

One of the locking arms is provided with upstanding pins 41 which are adapted to enter spring contacts 42 connected by means of wires 43 to the electrical circuit when the locking lugs are in the unlocked position.

The operation of the device is as follows:

Assuming the automobile to be standing at the curb, with the engine running, the dial is rotated, and due to pawl 30 engaging the recess in disk 10 the slide is retracted which through the pivoted links causes the lugs to enter the locking recesses in the steering post member. In the last portion of travel of the arms as the lugs enter the locking recesses, the pins 41 are removed from engagement with the contacts 42 and the ignition circuit is broken. Thus with one operation the wheels are rigidly locked and the engine put temporarily out of commission.

In order to unlock the car, the dial is rotated to the right until boss 50 on disk 10 picks up the combination disks in the usual manner. The point of the combination reached, the dial is reversed which alines recesses 33 in the three disks and allows pawl 30 to engage therewith under the action of spring 35. Further rotation of the dial to the left causes pressure to be exerted on the slide which moves forward, releases the lugs from the locking recesses and engages pins 41 with contacts 42 which closes the circuit and the motor is ready to start.

It will thus be seen that it is impossible to stop the engine without rigidly locking the front wheels. This is in itself a feature of importance, as a driver is too apt to fail to lock the car either through carelessness or intent. With this device, the matter of locking the car is not optional with the driver, but in order to stop the engine by breaking the ignition circuit, the dial must be turned, and when the circuit is broken, the lugs are in position in the locking recesses.

Member 1 is standard for all makes of cars, the adjustment being in the tapered nipple 4 which may be of a size to fit member 1 to various sized steering posts.

Due to the several locking recesses, the front wheels may be locked at any desired angle, it simply being necessary to rotate the steering wheel until the front wheels occupy the desired position and then spin the dial.

The drawing shows the device attached to an automobile in which the steering post penetrates the instrument board in which case the barrel combination lies to the right thereof. For cars having instruments in that position the dial may occupy a position to the left, or even below the steering post, although it is preferred to place the dial upon the instrument board. In the case of cars in which the steering post does not penetrate the instrument board, the device may be placed in a vertical instead of a horizontal position as shown. Any combination of positions may be used to fit the arrangement of any car.

It will be readily apparent to those skilled in the art that I have devised an automobile lock that is simple, compact, readily installed and absolutely impossible to unlock without manipulation of the combination dial. The device when in the locked position positively locks the five screws used in assembling the whole and prevents withdrawal of the same until unlocked. It is readily adaptable to all makes of cars, and is an attractive and ornamental addition to the instrument board.

It will be noted that in allowing the combination sleeve to penetrate the instrument board, a positive lock results which prevents rotation of the wheel in locked position even though the attaching screws be removed.

It may be desirable to eliminate the steering post attachment entirely and provide the locking recesses in the steering post itself, but as this weakens the post to a certain extent, it is preferred to use the annular member which allows the entire mechanism to be removed if so desired.

Other suitable lock actuating means may be used such as a key in place of the barrel combination, and I therefore do not wish to be limited by the drawings forming a part of this specification, which merely show one embodiment of the invention.

It may be desirable to include in the electric circuit those of the headlights, starter, and horn or any combination of the ignition, headlight, starter or horn circuits which will prevent annoyance through sounding the horn or turning the lights on or off, or tampering with the starting mechanism.

It will also be apparent that various other modifications of the device may be made without departing from the spirit of my invention.

What I claim is:

1. A lock of the class described comprising a steering post collar provided with peripheral recesses, a casing inclosing said collar, levers provided with locking dogs pivoted in said casing, a slide adapted to actuate said levers by means of a toggle link connecting said levers and slide, and a lock mechanism adapted to actuate the slide.

2. A lock of the class described comprising a steering post collar provided with peripheral recesses, levers provided with dogs engaging said collar, and having an extending portion beyond said dogs, means to actuate said levers, and means to lock said actuating means, a casing having a cover, inclosing said actuating means, screws attaching said cover to said casing, the extending portions of the levers covering said screws when the device is in the locked position.

3. A lock of the class described comprising locking levers within a casing having dogs engaging a steering post attachment, actuating means for said levers, and locking means for said actuating means, said casing being provided with an opening through which the locking means may be removed, covered by a plate, said plate being held to said casing by a screw, said actuating means preventing rotation of the screw when the device is in the locked position.

In testimony whereof, I affix my signature.

ROBINSON R. STABLER.